Patented Apr. 13, 1954

2,674,790

UNITED STATES PATENT OFFICE 2,674,790

METHOD OF SOLDERING ALUMINOUS METAL PARTS BY TREATING WITH CHLORIDE FLUXES

Alden P. Edson, Hartford, and Isaac L. Newell, Wethersfield, Conn., assignors to United Aircraft Corporation, East Hartford, Conn., a corporation of Delaware No Drawing. Application April 15, 1950, Serial No. 156,231

8 Claims. (Cl. 29—368)

The present invention relates to the joining of metal parts by means of solder, and more particularly to the vapor fluxing of the metals to be joined.

Objects and advantages of the invention will be set forth in part hereinafter and in part will be obvious herefrom, or may be learned by practice with the invention, the same being realized and attained by means of the processes and compositions pointed out in the appended claims.

The invention consists in the novel processes and compositions herein shown and described.

The art of joining metals together by such operations as brazing, welding, soldering and the like has heretofore generally employed as fluxes compounds which leave residues after the joining operation. These fluxes are often difficult to remove from the metals either due to lack of complete solubility in the solvent employed or due to the geometry of the assembly. They are usually highly corrosive in the presence of moisture and often eventually lead to premature failure of the metal or the bond, and may interfere with the function or appearance of the parts joined. They may also interfere with paint adhesion, electroplating and other methods of finishing or protecting the surface of metals.

The normal requirement of a flux for brazing is that it shall remove metal oxides from the surfaces of the solder and the parts being joined, without significant detrimental effect on the metals themselves. Removal of the metal oxides can be effected by vapor-fluxing by means of a gaseous or volatile compound or mixture containing a reducing agent capable of reacting with the oxygen of the metal oxides so as to form a new oxide dispersed under the conditions of bonding, together with an agent capable of reaction with the metal formerly combined as metal oxide so as to produce a new metal compound dispersed under the conditions of bonding. In order to render the vapor-fluxing process effective, it is necessary that certain additional criteria obtain.

The first criterion for a gaseous flux is that the fluxing material shall be stably gaseous; that is, that it shall not spontaneously react internally or with the metals of the system so as to produce a liquid or solid phase under bonding conditions. This condition is assured in systems wherein the total thermodynamic free energy of the system would be increased by such a reaction or transformation.

The second criterion for a gaseous flux is, obviously, that the fluxing reaction must occur. This condition is met by those systems in which the total thermodynamic free energy of the system under bonding conditions is reduced by reaction of the gaseous atmosphere with all of the metal oxides of the system so as to provide dispersed new oxides and metal compounds.

The third criterion for a gaseous flux is that the new dispersed oxide or oxides shall not react with any component of the system so as to create an undispersed phase under bonding conditions. For instance, in a system containing a substantial quantity of iron oxide and zinc, hydrogen or hydrogen chloride will react with the oxygen of the iron oxide to produce dispersed water vapor which will again react with the zinc so as to produce undispersed zinc oxide. This criterion is met by systems in which the total thermodynamic free energy of the system would be increased by any reaction by which the dispersed new oxide could be converted to an undispersed phase.

The fourth criterion for a gaseous flux is that the dispersed new metal compound or compounds formed by the fluxing reaction shall not react with any component of the system so as to create an undispersed phase under bonding conditions. This criterion is met by systems in which the total thermodynamic free energy of the system would be increased by any such reaction.

The fifth criterion for a gaseous flux is that the gas shall not react to a harmful extent with the elemental metals of the system under bonding conditions. This condition is met by systems in which the total thermodynamic free energy of the system is not significantly decreased by such a reaction, and the desirable condition of no such reaction is provided by the systems in which the free energy would be increased by it. A representative violation of the latter condition is encountered in the treatment of cadmium with hydrogen chloride at elevated temperature, resulting in the formation of cadmium chloride and hydrogen.

Technically, the disperson of the products of the fluxing reaction is possible in three ways; as solid particles distributed in the metals of the system, as fused compounds dispelled from the bond area by the action of pressure or through the wetting action of the molten solder, or as gases dispersed in the atmosphere of the system and capable of removal with it. The latter represents the ideal condition, and is provided by all of the volatile inorganic chlorides for which tests are reported here.

It has heretofore been proposed to flux the parts to be brazed, welded or soldered by means of various fluorides or fluorine containing compounds, but the use of such fluorine compositions requires special expensive and elaborate equipment, and the fluorine compounds themselves are relatively expensive and dangerous to handle, thereby limiting to a considerable extent the application of the fluorine compounds to a large field of brazing and soldering operations.

Occasionally, use has been made of gaseous hydrogen chloride as an active fluxing agent, but this is generally undesirable due to the relatively large quantity of water which is formed and due to the fact that the reaction is not as completely irreversible as the reaction taking place with the oxidation of volatile metallic chlorides. Furthermore, in many instances, the relatively high free energy of the water resulting from the oxidation of the hydrogen produced results in the formation of other oxides of metals in the systems which are not dispersed thereby leaving contaminating oxide in the system. Due to the fact that the volatile chlorides of many metals react to form oxides having much lower free energy than water, this action is less likely to occur and there is a resulting improvement in the quality of the soldered joints.

The present invention provides a novel and improved process wherein the materials used are unobjectionable with respect to the etching or corrosion of the parts being joined, and no residual flux is left on the parts after the brazing or soldering operation has been completed, while the fluxing operation is efficiently carried out so that the metal parts are joined with a high strength bond. A further object of the invention is to provide a process of vapor fluxing of the parts to be joined by soldering or welding which process employs compounds which are relatively stable, are relatively nontoxic and may be handled with much less elaborate and expensive apparatus than the gaseous fluorine containing compounds, at the same time producing substantially equivalent bonds between the metals being joined.

Volatile inorganic chlorides which are completely a chloride and the non-chloride portion of which form relatively stable oxides having a lower free energy than water at the temperature of brazing, which oxides are either gaseous or have substantial volatility at the temperature of brazing, are substantially inert with respect to the metals being brazed, give good fluxing action when incorporated into the stable nonoxidizing atmosphere used in the brazing operation. These chlorides hereinafter referred to as "volatile inorganic chlorides" may be compounds which are liquid, gaseous or solid at normal temperatures and pressures.

In all instances the volatile inorganic chloride will be the chloride of a metal or compound which is inert with respect to the metals being brazed. Thus compounds such as sulphur monochloride, sulphur dichloride, and sulphur tetrachloride are excluded because of the high reactivity of the sulphur with the metal parts to be joined; carbon tetrachloride is not included because it is not an inorganic chloride, while nitrogen trichloride would no longer be a chloride at any normal soldering temperature due to its explosive properties. Compounds such as bismuth oxychloride are excluded because they are not completely a chloride and decompose to form undispersed oxides and mixed halides are also excluded inasmuch as they are not completely a chloride.

Of these volatile inorganic chlorides, those whose gas molecules are at least two-thirds heavier than air, and preferably at least three or four times heavier than air, are particularly suitable for incorporation into a stable, gaseous, nonoxidizing atmosphere for use as a flux, and this atmosphere may be stationary, or a continuous flow of the flux-containing atmosphere may be maintained through or past the parts being fluxed and brazed.

By "stable nonoxidizing atmosphere" is meant a gas without detrimental action on the metals employed. For example, if the materials used are not reactive with nitrogen, such as copper, nickel, and iron, then an atmosphere of pure dry nitrogen would be suitable as a carrier for the volatile inorganic chloride, while if the metal used would react with nitrogen, then an atmosphere of pure dry helium would be satisfactory as the carrier gas. In the case of volatile inorganic chlorides which are completely gaseous at the temperature of brazing, the stable nonoxidizing atmosphere may consist wholly of the volatile inorganic chloride.

By "stably gaseous" is meant a compound which does not decompose at the temperatures in question to yield products which are solid or liquid at those temperatures.

Excellent joints can be obtained between metal parts using the process of the present invention with a variety of alloys, for example with mild steel, malleable iron, 18–8 stainless steel, 12% chromium stainless steel, copper, brass, bronze, Phosphor-bronze, cobalt 50%-chromium 35%-tungsten 15%, nickel-copper alloys, zinc and cadmium alloys, nickel-chromium alloys, tungsten, gold alloys, and platinum, osmium, iridium and palladium particularly where these precious metals are to be joined to other metals.

Among the many volatile inorganic chlorides which may be used in carrying out the present invention, the following are exemplary of those which are particularly useful; boron trichloride, titanium tetrachloride, aluminum chloride, tungsten pentachloride, tungsten hexachloride, vanadium tetrachloride, molybdenum pentachloride, phosphorus trichloride, ammonium chloride, hydrazine hydrochloride, and hydroxylammonium chloride. Various other volatile inorganic chlorides which are completely chlorides are useful in fluxing particular metals or alloys, but are not as widely useful as the enumerated compounds, most of which are of general application. In the selection of a particular volatile inorganic chloride to be used for fluxing a particular metal, attention would, of course, be given to avoidance of the formation of undesirable metallic compounds. For instance, in general, it would be desirable to avoid the use of phosphorous trichloride where iron or steel parts were to be joined, although phosphorous trichloride would be entirely suitable for use in the fluxing and soldering of copper, nickel or cobalt alloys.

The volatile inorganic chlorides which are completely a chloride and are useful in the process of the present invention, avoid the inclusion of carbon, inasmuch as the presence of any carbon in the volatile chloride would give rise to the formation of soot, particularly if the fluxing operation is carried out at relatively high temperatures and some difficulty would be experienced with the use of such carbon containing chlorides even at temperatures as low as 450° F.

The strength of the soldered parts produced in practicing the present invention is at least as high as that of the soldered parts formed by the methods heretofore used and no flux residue at all remains in the parts formed by this process when the parts are free from dirt and oxides prior to joining. In parts contaminated with oxides prior to joining, any residue from the fluxing action is slight and proportional to the oxides originally present and is without corrosive effect on the parts soldered, thereby greatly contributing to the permanent strength of the soldered parts, and avoiding the necessity for subsequent cleaning of the parts in an attempted removal of the flux residues.

In carrying out the process the parts to be soldered with the solder in place at the joint may be enclosed in an air-tight muffle and the atmosphere within the muffle may be urged with a stable nonoxidizing gas such as pure dry nitrogen or pure dry helium and after the purging is complete and the parts have been heated, the volatile inorganic chloride fluxing agent may be introduced into the muffle just prior to the time when the temperature of the parts to be joined is raised to the soldering temperature.

Where rapid fluxing is desired, the entire stable non-oxidizing atmosphere may consist of the volatile inorganic chloride, and even more rapid fluxing action may be obtained by flowing the volatilized inorganic chloride through the muffle during the fluxing and soldering operations. Where rapid fluxing is not of importance, a small quantity of the gaseous or vaporized volatile inorganic chloride may be introduced into the stable nonoxidizing atmosphere, and the parts to be joined are allowed to remain in that atmosphere at the elevated temperature for as long a period as is necessary to completely flux the parts.

The time required for the fluxing, and the required concentration of the fluxing agent will depend largely upon the condition of the surfaces to be joined, and on those surfaces which have a considerable amount of oxide contaminant the treatment should be at a higher concentration of the fluxing agent, for a longer period of time, or with a dynamic flow of the volatile inorganic chloride, or some combination of these three factors. The amount of volatile inorganic chloride supplied to the parts to be fluxed should be in excess of the stoichiometrical requirements of the oxide contaminant for complete fluxing. Thus in many instances and where the joints are relatively free from oxides, a small fraction of 1% of the volatile inorganic chloride in the nonoxidizing atmosphere being flowed past or through the parts to be joined will be sufficient, particularly where the flowing of the fluxing gas is maintained for a considerable period of time. With joints where the contamination is relatively great, it may be desirable to treat the joints with an atmosphere which consists entirely of the gaseous or vaporized volatile inorganic chloride.

Moderately high temperatures are required for effective fluxing in accordance with the present invention, and in all instances the parts to be joined will be heated at temperatures of at least 450° F. during the fluxing and soldering operations. The higher the temperature the more rapid is the fluxing action, and where the metals and solder are suited to high temperature operation, temperatures as high as 2000° or 2500° F. may be employed. Even higher temperatures, if permitted by the metals used, would give even better fluxing action.

The unused chlorides, particularly where a dynamic flow of the flux containing atmosphere is maintained through or around the parts being joined, are easily recovered by absorption or condensation.

As previously stated, the volatile inorganic chloride in its gaseous or vapor form is at least two-thirds heavier than air, and is preferably at least three or four times heavier than air. Ammonium chloride, while useful, is thus less desirable than boron trichloride which has four times the specific gravity of air. Not only does the ammonium chloride readily tend to decompose into nitrogen, hydrogen and hydrogen chloride, as is also the case with hydrazine hydrochloride and hydroxylammonium hydrochloride, but it also requires the use of a closed muffle or other closed system so as to prevent the escape of the fluxing gas to the atmosphere. The heavier gaseous or vaporized chlorides can be used in a vented system where the muffle or hollow part being brazed is formed with an upper vent hole.

*Example No. 1*

The shell interior and core exterior of a hollow steel propeller blade are mechanically and chemically cleaned according to conventional methods. A sheet of 0.010" thick A. S. T. M. #2 silver solder foil is laid over the core tip and extended along the face and camber sides of the core. The shell is then slid over this subassembly and is secured to the core by a gas-tight joint such as a steel pipe extending into the leading and trailing edge cavities of the shell. Sufficient vanadium tetrachloride or sufficient ammonium chloride is introduced into the tip of the shell volume to produce at a temperature of 1650° F. not less than five times as much gas as the free shell volume. The assembly is then placed in a refractory alloy die and connections are made to the shell pipe lines and the shell is purged with ten volumes of dry, oxygen-free nitrogen. A pressure of one pound per square inch of this gas is introduced into the shell volume and a pressure of 16 pounds per square inch of nitrogen is introduced into the core volume. The shell volume is arranged to exhaust through a molten lead trap. The die and blade assembly are then placed in a furnace heated to 1650° F. and held in the furnace for sufficient time to permit satisfactory brazing. During the time in the furnace, no flow of gas into the shell is provided except such as may be necessary to maintain shell pressure of one pound per square inch.

Upon the completion of the brazing operation and prior to solidification of the molten lead in the lead trap, the shell volume is purged with not less than ten volumes of pure nitrogen. This produces a blade in which the shell and core are joined by a strong bond and in which there are no objectionable flux residues.

*Example No. 2*

In joining interior copper surfaces, such as pipes in the interior of a tank, the parts to be joined are held in position mechanically with silver-solder foil placed between them. Hydrazine hydrochloride or molybdenum pentachloride is then put in the interior of the tank in sufficient quantity to produce at least five volumes of vapor at the temperature to be used in joining. The tank is then closed with the exception of an upper vent hole and is heated by suitable means, such as furnace or salt bath. After the time required for the metal and brazing alloy to come to brazing temperature, the heat is removed and the tank allowed to come to room temperature. The tank is purged with nitrogen or other nonoxidizing gas to remove the flux while in the vapor phase. No washing or cleaning action is required after the brazing operation.

*Example No. 3*

In the manufacture of a hollow steel propeller blade comprised of a sheet steel shell airfoil section brazed to a hollow central core member, the shell interior and core exterior are first cleaned by conventional chemical and mechanical methods. A clean sheet of a silver brazing alloy 0.010" thick and approximately 4" wide, consisting of approximately 54% silver, 40% copper, 5% zinc, and 1% nickel, is placed over the tip of the core extending down both sides toward the shank as far as a bond between the shell and core is desired. The shell is sealed to the core exterior to form a gas tight volume with a steel pipe opening into the leading and trailing edge cavities. The blade is placed in a refractory alloy die which is clamped shut. The shell volume is then thoroughly purged with dry nitrogen and then with boron trichloride, exhausting the boron trichloride through 2 inches of mercury so as to maintain a pressure of approximately 1 p. s. i. in the shell volume. After completely purging the shell with boron trichloride, flow of this gas through the shell is discontinued and only sufficient gas is supplied to maintain shell pressure. Gas pressure of 16 p. s. i. is applied to the core interior and the die and blade assembly are run into a furnace maintained at a temperature of 1600° F. to 1675° F. This blade and die are left in the furnace for sufficient time to bring the blade substantially to furnace temperature and allow melting and flow of the brazing alloy. At the end of this time, the blade and die are withdrawn from the furnace and cooled. The shell volume is purged with dry nitrogen until free from boron trichloride to produce a blade with the shell and core brazed together and free from objectionable deposits.

*Example No. 4*

In the manufacture of electric contact points in which a tungsten disc is copper brazed to a steel member, assemblies of the steel member, copper foil, and tungsten disc are placed in a heated muffle which is sealed. The air is purged from the muffle by means of an inert atmosphere, and gaseous vanadium tetrachloride is admitted to the muffle. The temperature is raised to 2200° F. and the joining of the metals takes place. The muffle is allowed to cool, and, when the temperature is below the solidification point of copper, the muffle is again purged with an inert gas. The muffle is then allowed to cool to room temperature and the assemblies removed. No cleaning will be necessary on these parts.

It is to be understood that the present invention is not confined to the fluxes and metals mentioned in the foregoing specification assemblies but that the volatile inorganic chlorides, and particularly the volatile inorganic chlorides which react to form oxides having a lower free energy than water, may be used for the fluxing of various metals to be soldered.

Certain of the fluxes, of course, are more desirable and give better results with certain metals than other fluxes with those metals, and the best results will always be obtained by properly selecting the flux for the metals to be used in soldering. Thus for the ferrous, copper, nickel, cobalt and precious alloys almost any of the volatile inorganic chlorides are satisfactory, and with ferrous alloys boron trichloride, ammonium chloride, vanadium tetrachloride, and tungsten hexachloride are particularly desirable; with the copper alloys hydrazine hydrochloride and hydrazinium hydrochloride as well as phosphorous trichloride give very satisfactory joints. With monel metal, boron trichloride and molybdenum pentachloride give excellent results. With the zinc alloys and with cadminum metal and alloys, most of the volatile inorganic chlorides are useful and boron trichloride, titanium tetrachloride and silicon tetrachloride are particularly useful. As other examples, aluminum and its alloys may be satisfactorily fluxed using titanium tetrachloride, the nickel-chromium alloys may be fluxed by using zirconium tetrachloride or most of the other volatile inorganic chlorides. Tungsten and its alloys may be satisfactorily fluxed using vanadium tetrachloride, molybdenum pentachloride, boron trichloride with most of the volatile inorganic chlorides.

In use, ammonium chloride and the other chlorides of compounds containing nitrogen and hydrogen provide a greater proportion of available hydrogen for the reduction of the metallic oxides than would be available from the hydrogen chloride, thus giving a mass action effect which promotes the fluxing. They are easier to use than a mixture of hydrogen chloride and hydrogen. The speed of reaction with the oxide contaminant is greater and the fluxing of the joint is completed in a much faster time which time can, of course, be shortened by flowing a mixture of dry nonoxidizing gas carrying the ammonium chloride vapor or other inorganic chloride vapor past the parts to be fluxed and soldered.

In general, the volatile inorganic chlorides which form stable oxides and are 3 to 4 times heavier than air produce soldered joints of strength equal to that of joints produced by fluxing with vaporized or gaseous fluorine containing compounds, and yet present numerous advantages over the use of such fluorine-containing compounds.

In both the reacted and unreacted states, chlorides are generally less toxic than the fluorides, are cheaper and more easily available than the fluorides, and the disposal or collection of the waste products from the fluxing operation is less complex and dangerous. In general, the chlorides have a higher specific gravity than the fluorides and are thus more adaptable to use in systems where the gases are exhausted through a vent at atmospheric pressure. With aluminum alloys, they are much more active than the fluorides.

The invention in its broader aspects is not limited to the specific processes and compositions shown and described but departures may be made therefrom within the scope of the accompanying claims without departing from the principles of the invention and without sacrificing its chief advantages.

What is claimed is:

1. The process of joining metal parts selected from the group consisting of aluminum and aluminum-containing alloys by solder which includes fluxing the metal parts and solder at soldering temperature by means of a stable gaseous atmosphere substantially inert with respect to the metals being treated but reactive with their oxides, the active component of which atmosphere is provided by a volatile inorganic chloride having two or more chlorine atoms connected to a single atom and having a molecular weight at least 117 reactive with the oxide of the metals, said chloride being volatile at soldering temperatures and subjecting the metal parts to said stable gaseous atmosphere at soldering temperature until the metal parts have been bonded by said solder.

2. The process of joining metal parts selected from the group consisting of aluminum and aluminum-containing alloys by solder which includes fluxing the metal parts and solder at soldering temperature by means of a stable gaseous atmosphere, substantially inert at soldering temperature with respect to the metals being treated, the active component of which atmosphere is provided by a volatile inorganic chloride having two or more chlorine atoms connected to a single atom and having a molecular weight at least 117 reactive with the oxides of the metals, which chloride is volatile below the soldering temperature, and subjecting the metal parts to said stable gaseous atmosphere at soldering temperature until the metal parts have been bonded by said solder and purging the solder and metals of said chloride.

3. The process of joining metal parts selected from the group consisting of aluminum and aluminum-containing alloys by solder which includes fluxing the metal parts at soldering temperature by means of a stable gaseous atmosphere inert with respect to the metals being treated, which atmosphere consists of a volatile inorganic chloride having two or more chlorine atoms connected to a single atom and having a molecular weight at least 117 which is completely gaseous below the soldering temperature and subjecting the metal parts to said stable gaseous atmosphere at soldering temperature until the metal parts have been bonded by said solder.

4. The process of joining metal parts selected from the group consisting of aluminum and aluminum-containing alloys by solder which includes fluxing the metal parts at soldering temperature by means of a stable gaseous atmosphere inert with respect to the metals being treated, which atmosphere consists of an inert gas and a volatile inorganic chloride having two or more chlorine atoms connected to a single atom and having a molecular weight at least 117 which is non-gaseous at normal temperatures and pressures and is volatile below the soldering temperature, and subjecting the metal parts to said stable gaseous atmosphere at soldering temperature until the metal parts have been bonded by said solder, and purging the solder and metals of said chloride with a stable inert gas before solidification of said solder.

5. The process of joining metal parts selected from the group consisting of aluminum and aluminum-containing alloys by solder which includes fluxing the metal parts and solder at soldering temperature by means of a stable gaseous atmosphere, substantially inert at soldering temperature with respect to the metals being treated and consisting of a volatile inorganic chloride having two or more chlorine atoms connected to a single atom and having a molecular weight at least 117, reactive with the oxides of the metals, which chloride is non-gaseous at normal temperatures and pressures and which is completely gaseous at the soldering temperature and pressure and subjecting the metal parts to said stable gaseous atmosphere at soldering temperature until the metal parts have been bonded by said solder.

6. The process of joining metal parts selected from the group consisting of aluminum and aluminum-containing alloys by solder which includes fluxing the metal parts and solder at soldering temperature by means of a stable gaseous atmosphere, substantially inert at soldering temperature with respect to the metals being treated, the only active component of which atmosphere is provided by a volatile inorganic chloride having two or more chlorine atoms connected to a single atom and having a molecular weight at least 117 reactive with the oxides of the metals, which chloride is non-gaseous at normal temperatures and pressures and is volatile below the soldering temperature and subjecting the metal parts to said stable gaseous atmosphere at soldering temperature until the metal parts have been bonded by said solder.

7. The process of joining metal parts selected from the group consisting of aluminum and aluminum-containing alloys by solder which includes fluxing the metal parts and solder at soldering temperature by means of a stable gaseous atmosphere, substantially inert at soldering temperature with respect to the metals being treated, the active component of which atmosphere is provided by boron trichloride and subjecting the metal parts to said stable gaseous atmosphere at soldering temperature until the metal parts have been bonded by said solder.

8. The process of joining metal parts selected from the group consisting of aluminum and aluminum-containing alloys by solder which includes fluxing the metal parts and solder at soldering temperature by means of a stable gaseous atmosphere, substantially inert at soldering temperature with respect to the metals being treated, the active component of which atmosphere is provided by vanadium tetrachloride and subjecting the metal parts to said stable gaseous atmosphere at soldering temperature until the metal parts have been bonded by said solder.

References Cited in the file of this patent

UNITED STATES PATENTS

| Number | Name | Date |
|--------|------|------|
| 943,164 | Schoop | Dec. 14, 1909 |
| 1,536,944 | Steenstrup | May 5, 1925 |
| 2,100,974 | Neilson | Nov. 30, 1937 |
| 2,561,565 | Edson et al. | July 24, 1951 |
| 2,561,566 | Edson et al. | July 24, 1951 |
| 2,585,819 | Moore et al. | Feb. 12, 1952 |

FOREIGN PATENTS

| Number | Country | Date |
|--------|---------|------|
| 677,994 | Germany | July 6, 1939 |

OTHER REFERENCES

Amer. Mach., Controlled Heat-Treating Atmospheres, November 12, 1942, pp. 1315 and 1317.